United States Patent Office.

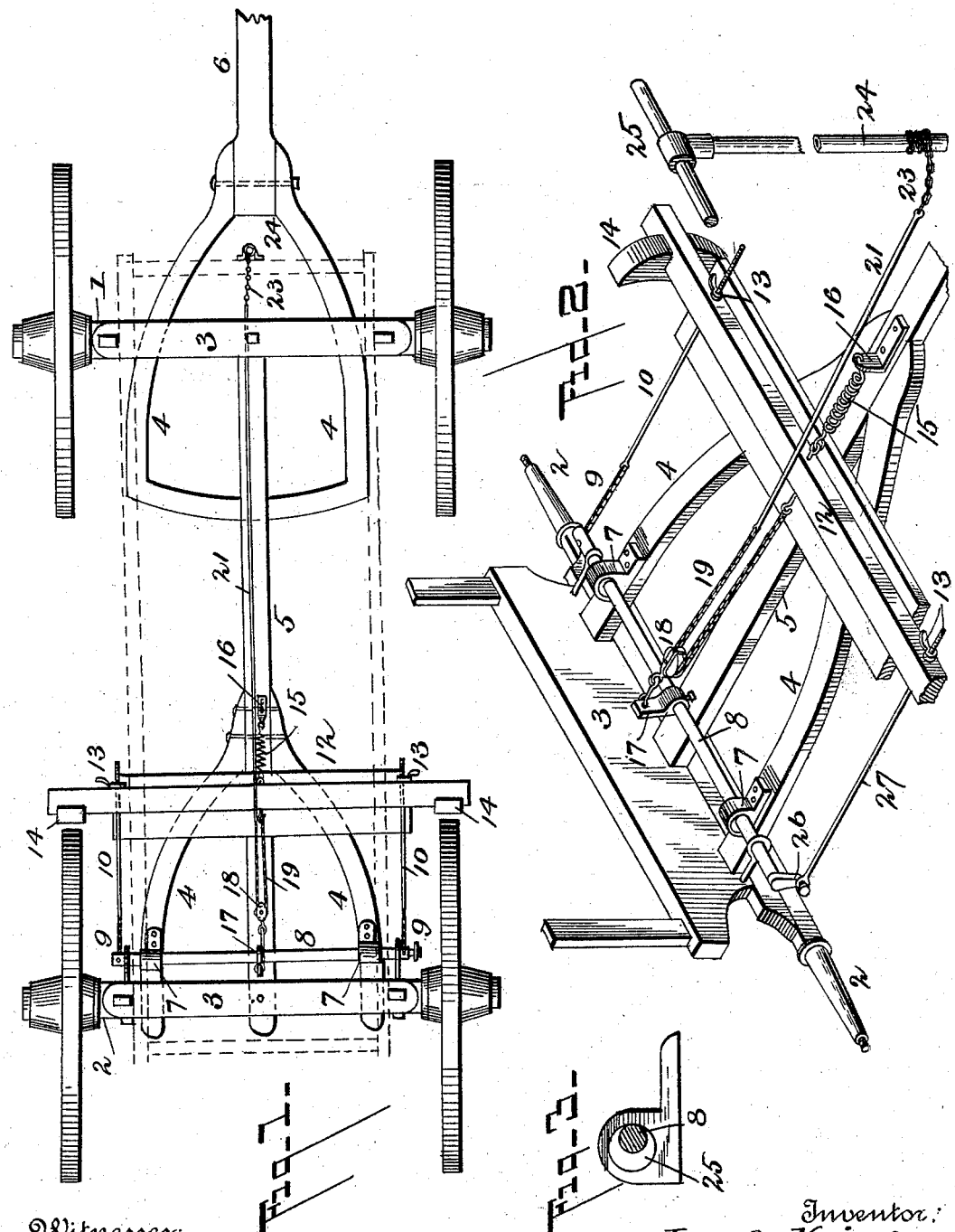

JOSEPH KRIEG, OF ST. MARY'S, PENNSYLVANIA, ASSIGNOR OF ONE-HALF TO JOHN L. KAUL, OF HOLLINS, ALABAMA.

WAGON-BRAKE.

SPECIFICATION forming part of Letters Patent No. 505,048, dated September 12, 1893.

Application filed March 8, 1893. Serial No. 465,127. (No model.)

*To all whom it may concern:*

Be it known that I, JOSEPH KRIEG, a citizen of the United States, and a resident of St. Mary's, in the county of Elk and State of Pennsylvania, have invented certain new and useful Improvements in Wagon-Brakes; and I do hereby declare that the following is a full, clear, and exact description of the invention, which will enable others skilled in the art to which it appertains to make and use the same, reference being had to the accompanying drawings, which form a part of this specification.

My invention relates to improvements in brake mechanism for wagons and other vehicles and its object is to provide a novel construction of the same whereby the brake shoes may be applied to the wheels with great force, thus effectually checking the movement of the same.

The invention consists in the novel construction and combination of parts hereinafter fully described and claimed.

In the accompanying drawings: Figure 1 is a plan view of the running gear of a wagon with my improvement applied thereto. Fig. 2 is a perspective view of the rear portion of the same. Fig. 3 is a sectional view of the brake actuating shaft.

In the said drawings, the reference numerals 1 and 2 designate the front and rear axles, 3 the bolsters secured thereto in any suitable manner, 4 the hounds, 5 the reach and 6 the tongue.

Journaled in bearings 7 secured to the rear hounds is a transverse shaft 8, with which is connected at each end a chain 9, Fig. 1, also connected with rods 10, passing through the brake beam 12. The front ends of these bars are screw threaded and provided with hand nuts 13, by which they may be adjusted.

The brake beam is provided with brake shoes 14, and is also provided with a coiled spring 15, secured thereto and to a lug 16 on the reach 5.

At its center the shaft 8 is provided with an upwardly projecting arm 17, with which is connected a sheave 18. Passing around this sheave is a chain 19, one end of which is secured to a rod 20 secured to the brake beam while the other end is secured to a rod 21 leading to the front of the wagon where it is connected with a chain 23, secured to a vertical shaft 24, provided with handles 25.

The operation of the invention so far described is as follows: The brake shoes may be set by turning the shaft 8, which may be provided with a lever for such purpose. This turning or rotating of the shaft causes the chains 9 to be wound thereon, pulling the brake beam back and throwing the brake shoes into contact with the wheels. When it is desired to set the brakes from the front, the shaft 24 is rotated, winding the chain 23 thereon and pulling the bar or rod 21 forwardly, actuating the chain passing around the sheave and forcing back the brake beam. At the same time, by means of arm 17 the shaft 8 is also rotated thus serving as an additional means for moving the brake beam as before set forth.

For the purpose of increasing the power by which the brake shoes are applied to the wheels, the shaft 8 is provided with eccentrics 25, which are seated in the bearings 7. It will be evident that as the shaft is rotated to wind the chains thereon, it will be forced rearwardly by means of the eccentrics, thus serving as additional means for operating the brake beam.

Instead of providing the shaft 8 with chains for operating the brake beam it may be provided with a crank 26, at each end, see Fig. 2. One only of these cranks, however, is shown, but in practice there will be one at each end of the shaft. In this case the crank is connected with the brake beam by means of a rod 27.

From the above it will be seen that I provide a brake mechanism by which the brake shoes may be applied to the wheels with great pressure, by the expenditure of but very little power on the part of the operator.

Having thus described my invention, what I claim is—

In a brake mechanism, the combination with the brake beam, the transverse rotatable shaft, the chain and rods adjustably connected therewith and the arm secured to said shaft provided with a sheave, of the chain passing around said shaft and connected with the brake beam, the rod connected with the other end of said chain and leading to the front of the vehicle, the chain connected therewith and the rotatable shaft to which said chain is secured; substantially as described.

In testimony that I claim the foregoing as my own I have hereunto affixed my signature in presence of two witnesses.

JOSEPH KRIEG.

Witnesses:
BENNETT S. JONES,
STEWART SHEA.